US007724385B2

(12) United States Patent

Foth et al.

(10) Patent No.: US 7,724,385 B2
(45) Date of Patent: May 25, 2010

(54) SYSTEM FOR PRESERVING SECURITY WHILE HANDLING DOCUMENTS

(75) Inventors: Thomas J. Foth, Trumbull, CT (US); Christopher C. Lang, Madison, WI (US); Frederick W. Ryan, Jr., Oxford, CT (US)

(73) Assignee: Pitney Bowes Inc., Stamford, CT (US)

( * ) Notice: Subject to any disclaimer, the term of this patent is extended or adjusted under 35 U.S.C. 154(b) by 1872 days.

(21) Appl. No.: 10/744,406

(22) Filed: Dec. 23, 2003

(65) Prior Publication Data

US 2005/0135657 A1 Jun. 23, 2005

(51) Int. Cl.
*G06F 15/00* (2006.01)
*H04N 7/18* (2006.01)

(52) U.S. Cl. ........................................ 358/1.14; 348/63

(58) Field of Classification Search ................ 358/1.14, 358/1.15, 468, 479, 437, 474; 382/154, 284, 382/321; 348/61, 63, 345, 563, 370, 371, 348/14.01, 91, 573; 270/58.03, 58.04; 386/46; 355/65, 66, 133; 705/1, 10, 14, 26

See application file for complete search history.

(56) References Cited

U.S. PATENT DOCUMENTS 5,091,777 A * 2/1992 Gleason ....................... 348/61
2004/0120016 A1 * 6/2004 Burke ......................... 358/442

* cited by examiner

*Primary Examiner*—Saeid Ebrahimi Dehkordy
(74) *Attorney, Agent, or Firm*—Ronald Reichman; Angelo N. Chaclas

(57) ABSTRACT

A mail handling system for handling mail pieces in a mail handling area is presented. The system avoids breaching confidentiality of the mail pieces, and includes a view port device, for providing filtered visual access to a portion of the mail handling area while at least some information contained in the mail pieces is filtered out. The system also includes a manual access area, for allowing manual access to the mail handling area while unfiltered visual access to the mail handling area is obstructed.

17 Claims, 5 Drawing Sheets

SYSTEM FOR PRESERVING SECURITY WHILE HANDLING DOCUMENTS

TECHNICAL FIELD

The present invention relates to confidential items such as mail, and more particularly, to providing a handling area that preserves that confidentiality.

BACKGROUND OF THE INVENTION

A problem in law firms serviced by in-house or remote mailrooms is that the firms would like to have their mail scanned (so they can read it remotely, apply artificial intelligence to filter it, and search it by keyword), but they feel a responsibility (related to attorney-client privilege) to prohibit mail room employees from opening their mail. Innovations are needed to provide that service with greater confidentiality than can be afforded by a non-disclosure agreement. Furthermore, the same problems apply to other document handling situations, such as shredding, copying, printing and inserting.

Current solutions for maintaining confidentiality during document handling include automated document handlers that can be secure containers such that no human will see the documents being processed. However, it is extremely expensive to make these machines handle non-standard documents, such as documents with clips, staples, extra envelopes, bizarre sizes and attachments.

SUMMARY OF THE INVENTION

The current invention provides the flexibility of a human document handler, while retaining the security available in a fully automated system. The basic idea of the current invention is to protect the confidentiality of a document that is being handled by filtering what the handler is able to detect about it. The idea is to enforce a kind of "selective blindness" on the handler. The handler can use a viewscreen or translucent window in lieu of the handler's own direct sight, in order to see what they are doing while they handle the document, and the viewscreen displays only non-confidential information. For example, it obscures or blurs the text, but allows the user to see everything else about the document (e.g., the position, shape, number of pages, etc.) as though they were seeing the real thing. A video monitor can be used to record that the handler has followed protocols, and beacons in the field view of the video monitor can establish that the camera feed is authentic. The beacons flash an encrypted time signal, so that a forged camera feed would be readily detectable.

A handling system can thus process pieces in a handling area, without breaching confidentiality of the mail pieces. Such a mail handling system includes a view port device for providing filtered visual access to the mail handling area while at least some information contained in the mail pieces is filtered out. A manual access area allows manual access to the mail handling area while unfiltered visual access to the mail handling area is obstructed. The present system is usable not just for mail handling, but also for handling other types of items such as intra-office papers, packages, or various other types of items. Those various other types of items may be vials of blood with labels containing confidential information. Or, the items may be labeled samples for blind testing, such as water samples from different locations.

The present invention also relates to a handling enclosure for securely handling items, including mail or the other types of items just described. The enclosure is either fully or partly enclosed, and it includes a concealing surface for obstructing unfiltered visual access to the mail handling area from a plurality of vantage points. The mail handling enclosure also includes a manual access area, for allowing manual access to the mail handling area while the visual access is obstructed.

The invention furthermore includes a method for a user to handle mail pieces in a mail handling area without breaching confidentiality of the mail pieces. This method includes the step of providing filtered visual access to a portion of the mail handling area via a view port device that filters out at least some information contained on a mail piece, for example on a letter that is removed from an envelope and unfolded. This method also includes the step of providing the user with physical access to the mail handling area for handling the mail pieces.

According to another embodiment of the present invention, a system authenticates a video image of at least a portion of a secure area, such as a mail handling area. This system includes a video camera, for viewing the secure area, a video image recorder for recording an image produced by the video camera, and authenticating beacons within view of the video camera. The authenticating beacons indicate what time its is, which is the time at which the respective beacon is observed by the video camera. The chronological indication from the authenticating beacon is advantageously encrypted, so as to foil any attempt at providing a false image to the video image recorder. This system may additionally include an image processing unit, responsive to the video camera, for providing a processed video signal to the video image recorder. The image processing unit excludes information concerning confidential mail material that was viewed by the video camera, and that information is excluded from the processed video signal that is fed to the video image recorder.

DETAILED DESCRIPTION OF THE INVENTION

The current invention permits efficient handling of items that contain confidential material, by permitting the user to see more than someone could see using alternative approaches, such as a blindfold, or enclosing the process in a glovebox with no way to look inside, or employing a blind document handler. Another alternative approach is the non-technological solution of simply binding the user with a non-disclosure agreement, but that would not lend as much confidentiality, since the handler might accidentally disclose information about what the handler saw, or might breach the agreement (and perhaps deny the breach). In contrast, the current invention protects against the risk of accidental disclosure, and empowers the user to prove that confidentiality was not breached.

Figure 1:
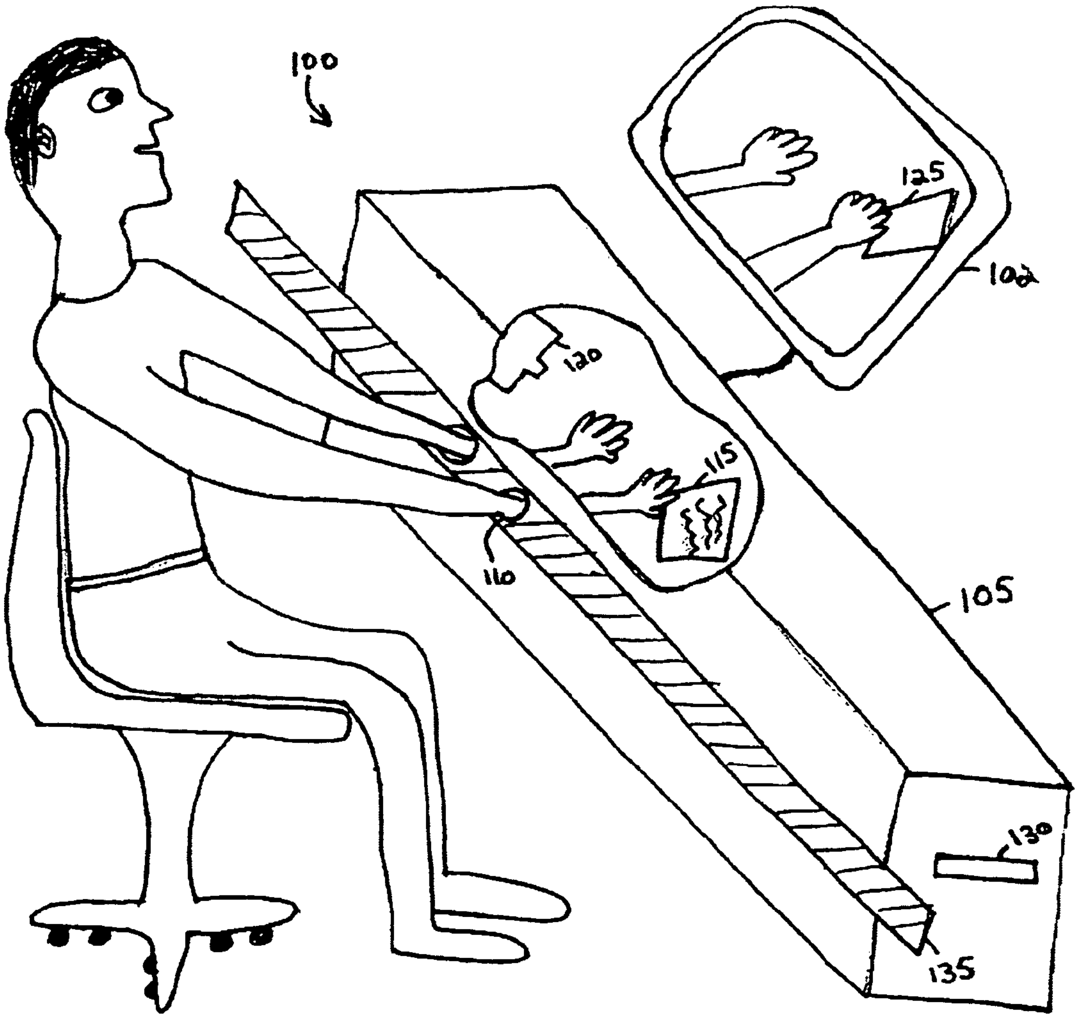
FIG. 1 shows a person using an embodiment of the present invention.

As seen in FIG. 1, a preferred embodiment of the present mail handling system 100 includes a view port device 102 which allows a user to see a mail handling area 105 inside a mail handling enclosure. The user's hands can be inserted into the mail handling area 105, using a manual access area

110 which may include gloves for each hand. The user in FIG. 1 cannot see his hands directly, but can see his hands using the view port device 100. As can be seen in the cutaway view of FIG. 1, the user is able to handle documents 115 which are viewed by a camera 120 that in turn provides an image. However, the image of the paper 125 excludes or obscures confidential material that is on the actual paper 115. FIG. 1 also shows a slot 130 for inserting mail into the mail handling area, and moreover this embodiment includes a sliding device 135 so that the user will be able to move his hands around the mail handling area. Regarding the slot 130, that is only one of several ways for inserting items into the mail handling area 105. If a slot 130 is used, it may be attached to a chute in order to prevent anyone from peering into the slot to see confidential material. In order to accommodate larger items, an access door can be used in addition to or instead of the slot. The access door would provide access to waiting space, and when the access door is shut then an internal door from the waiting space to the mail handling area 110 is opened, and items move from the waiting space to the manual access area. This movement of items can be accomplished by a slanted floor, or by a conveyor belt, or by the user reaching into the waiting space via the manual handling area 110.

Thus, the view port device 102 provides filtered visual access to at least a portion of the mail handling area while information contained in mail pieces within the mail handling area is filtered out. The manual access area 110 allows manual access to the mail handling area while unfiltered visual access to the mail handling area is obstructed. It is to be noted that, instead of being acquired by the camera 120, the image presented by the view port device 102 may instead be acquired by a scanner on which the user is scanning a document, and thus the user would be able to properly position the document without reading its contents. In that case, the camera 120 can still be useful for security purposes, in order to make a record that proves the confidential material was handled in a secure manner. The mail handling area 110 accommodates not just a scanner, but potentially also other useful mail handling machines such as a shredder, printer, and facsimile machine.

Figure 2:
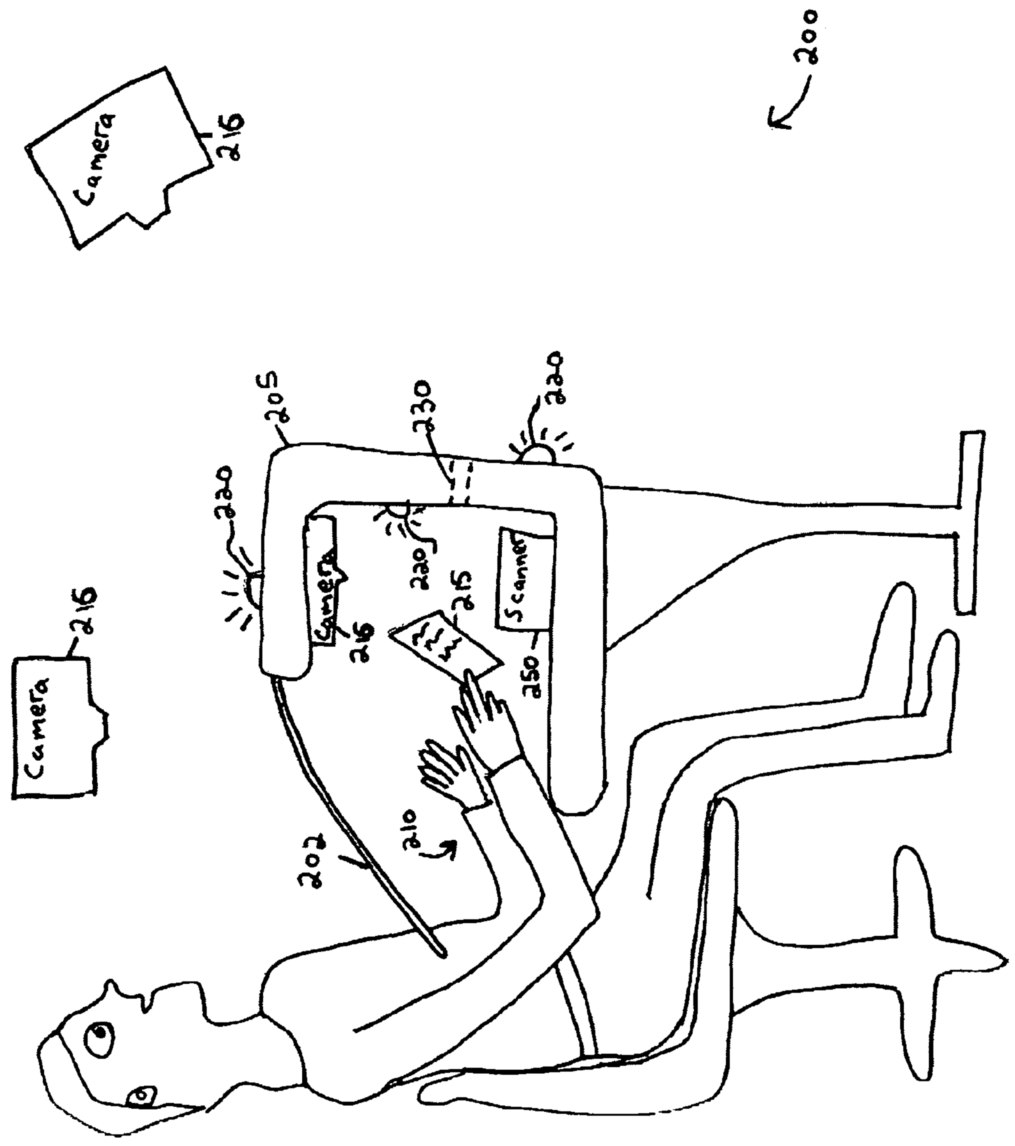
FIG. 2 shows a person using another embodiment of the present invention.

Another embodiment is shown by FIG. 2. The user again is unable to see directly into the mail handling area, and instead uses a view port device 202 which in this embodiment is a piece of glass or plastic that is not perfectly transparent, and therefore blurs text on the document 215. Before the mail is inserted into the mail slot 230, the user may, for example, write the name of the intended recipient in very large letters on the envelope, so that the user will know which envelope he is opening inside the mail handling area 205. The manual access area 210 in this embodiment leaves a great deal of flexibility for the user to move his hands around, and alternatively the type of manual access area 110 shown in FIG. 1 can be used in conjunction with the glass or plastic 202.

Because the manual access area 210 is not very secure, it is advantageous to use a good system of security cameras 216 to make sure that all protocols are followed; for example, one of the protocols is that the user should not peek into the manual access area 210. In order to ensure that the images recorded by the cameras 216 are authentic, beacons 220 may be used in the field of view of the cameras, and the beacons emit signals that vary over time and are preferably encrypted, which allows someone (or a machine) viewing the video to make sure that a forged or false video has not been supplied. The user will typically open an envelope, scan the mail using a scanner 250, send the mail electronically to the intended recipient, and shred the original. The shredder would be located in the secure mail handling area 205 along with the scanner and possibly other devices too such as a facsimile machine.

Figure 3:
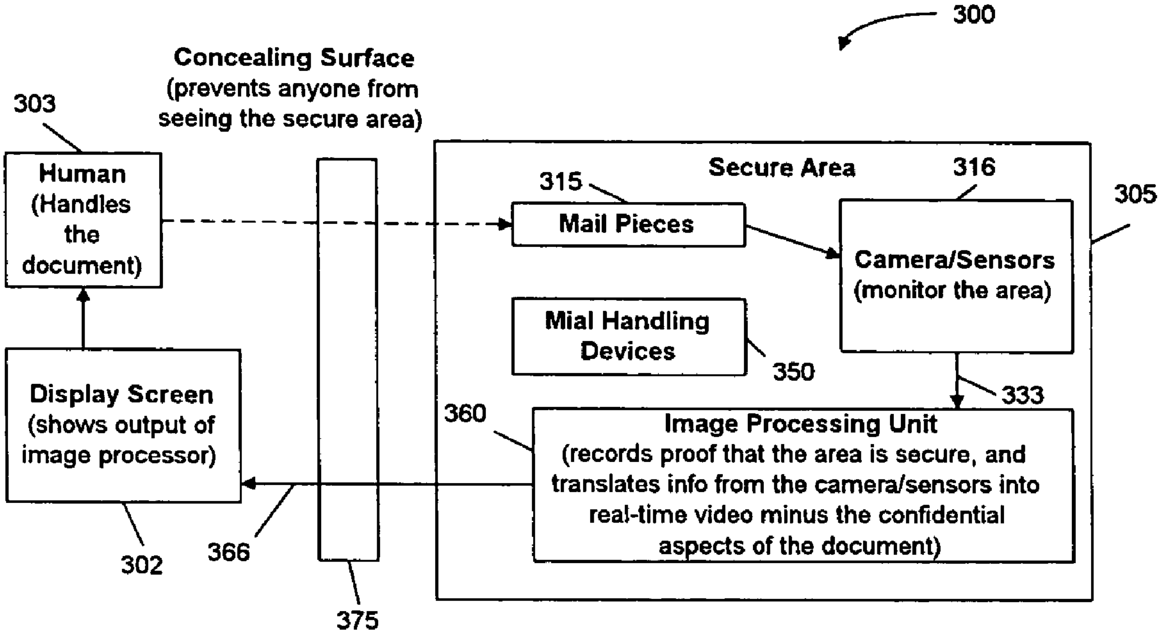
FIG. 3 is a block diagram of an embodiment of the present invention, for handling documents in a secure area.

FIG. 3 shows an embodiment of the present system 300 in the form of a block diagram. A human 303 has the assignment of handling documents such as mail pieces 315. A concealing surface 375 prevents anyone from seeing the secure area 305 in which the documents are handled, at least from a plurality of vantage points including the vantage point of the human 303, and at least with respect to seeing the secure area clearly and completely. Images of the mail pieces are acquired by a camera 316, which sends an image in electronic form as an unprocessed video signal 333 to an image processing unit 360, which in turn provides a processed video signal 366 display on the display screen 302. The image processor subtracts confidential aspects of the mail pieces 315.

Figure 4:
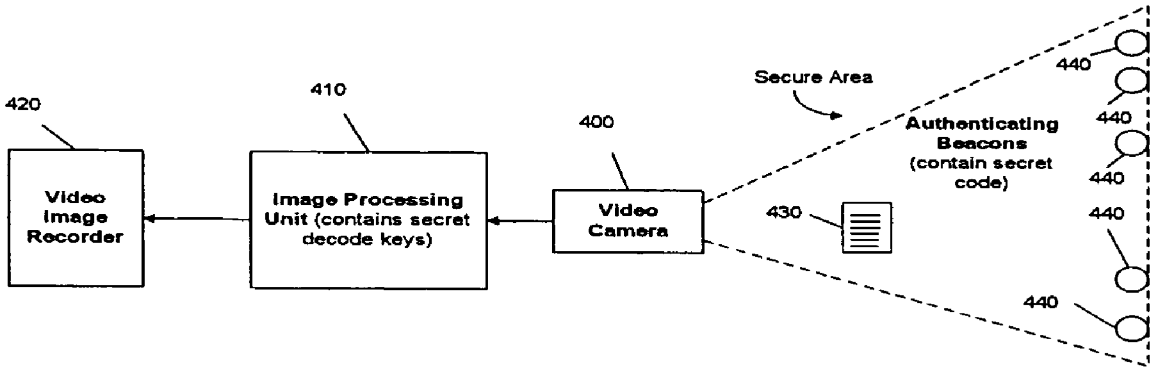
FIG. 4 shows a system for viewing a secure mail handling area using beacons in the filed of the camera.

FIG. 4 shows the use of authenticating beacons 440 in the context of the present invention. The beacons are located in a secure area, within the field of view of a video camera 400, and they emit encrypted, time-sensitive signals. Mail pieces 430 are also in the field of view of the camera 400. The camera sends the video information to an image processing unit 410, which subtracts confidential information obtained from the mail 430, decodes the encrypted beacon signals, verifies whether the image is authentic, and sends the image to the video image recorder 420 for recordation.

Figure 5:
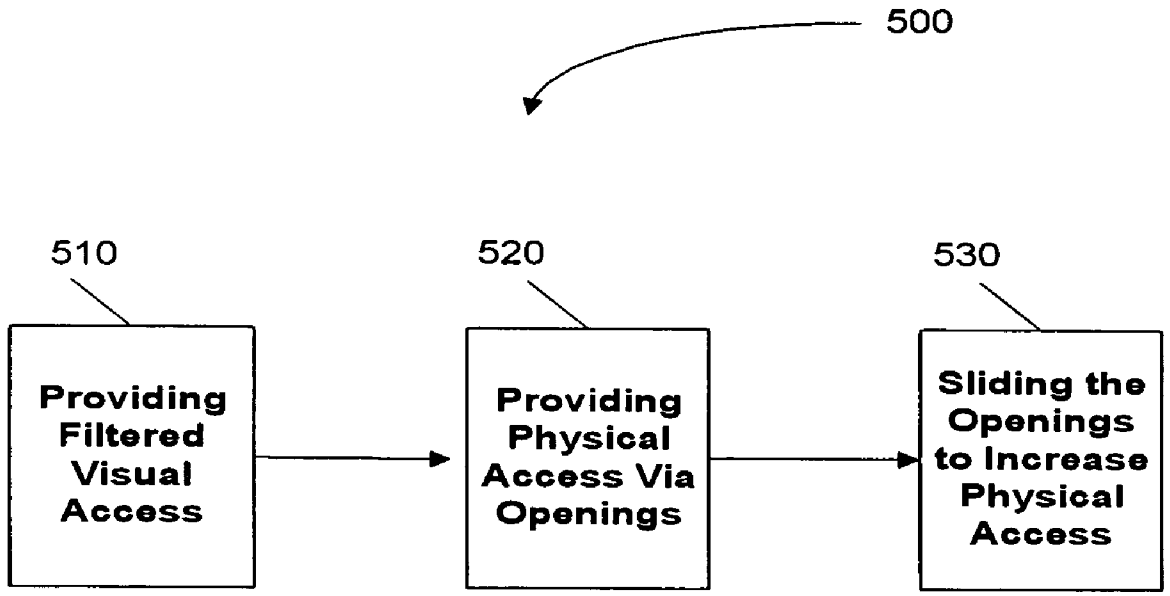
FIG. 5 is a flow chart of a method according to the present invention.

FIG. 5 illustrates the method 500 according to embodiments such as that already shown in FIG. 1. The first step 510 is providing filtered visual access to the mail in the mail handling area, in order to filter out confidential information. The next step 520 is to provide physical access to the mail pieces via openings into which a person's hands can be inserted, and these openings may be equipped with gloves. This is followed by the step of sliding 530 the openings to increase the physical access of the user to the mail handling area.

The present invention may be viewed as having seven components, according to a preferred embodiment. The documents and handling devices (e.g., printer, fax, scanner) are contained in a secure area (e.g. the interior of a box), and an obscuring device (the walls of the box) prevent the human handler from seeing the contents of the secure area with his or her own eyes. To this, the current invention adds cameras/sensors (such as a scanner) that monitor the area and send the information they collect to an image processor which uses that image to construct real-time video of what is happening in the box, but obscures confidential information. The resulting image is presented to the human on a viewscreen outside the secure area. For example, it may translate information from a scanner into a picture of the scanning area (as most scanner software does) except replace any inked areas with boxes filled with the words "ink here." The human could then see whether the document was positioned correctly, yet could not tell what was on the document.

The image processor also records enough evidence from the sensors to prove that the secure area remained secure. For example, it might record video feed from cameras that monitor the entire secure area. This would, for example, empower an attorney to prove that mail opened and resealed in the secure area did not constitute a breach of attorney-client privilege.

Here is an example scenario for using this invention in a mailroom. The mailroom receives a piece of mail. The intended recipient wants their mail scanned and wants the encrypted resulting images to be sent to an artificially intelligent agent which will decide whether to reroute it. A mailroom worker places the mail in the secure area (which also contains a letter opener, staple remover, stapler, scanner, shredder and empty envelopes).

The obstructing mechanism is engaged so that no one can see into the secure area (in a glovebox, this would entail closing the door). The cameras/sensors monitor the secure area, send the information they collect to the image processor which obscures any potentially confidential information, and the result is seen on the viewscreen by the mailroom worker. From their point of view, it simply looks like they are seeing the secure area, except that the documents in it contain no confidential information. The mailroom worker opens the mail with the letter opener (in a glovebox he/she would place his/her hands into gloves attached to the walls of the box and manipulate the envelope through the gloves. He/she then removes the contents from the envelope and scans them with the scanner. The scanner sends encrypted images of the scanned documents to the artificially intelligent agent which decrypts them, reads them, determines that the mail piece is junk mail, and sends the mailroom worker a message to shred it (the instruction is received in a matter of seconds). The mailroom worker shreds the envelope and its contents, as directed, using the shredder. He/she then opens the next envelope and scans it as before-this time the artificial intelligence instructs him/her to deliver the top page to the intended recipient and the rest to the recipient's secretary. The worker places the top sheet in an envelope, seals it, and addresses it to the intended recipient. He/she places the rest (including the original envelope) in a second envelope, seals it, and addresses it to the secretary. After all the mail has been opened, scanned, and shredded or resealed, the worker disengages the obscuring mechanism, removes the contents, and physically delivers the sealed envelopes as instructed. In addition to the mail and image files, the intended recipient receives an encrypted copy of the videotapes for that session-they can use these to prove that no human saw the contents of the mail during the time between when it was opened and when it was shredded or resealed.

An extension of the present invention addresses what happens if the sensors include chemical or aerosol detectors and the secure area is secure against hazardous materials; in that case, the current invention has been extended to protect people from hazardous materials deployed by mail. Now, if a package is received containing a hazardous material, the danger may be detected in the secure area, and the contents may be scanned before they are destroyed. In this way, the intended recipient receives the encrypted scan image, but is protected from the danger.

The basic idea behind the beacon aspect of the current invention is to detect security attacks in which a camera feed is replaced by a false one, such as when a picture of what a camera usually sees is inserted in front of it, or the video signal coming out of a camera is replaced with false one. Beacons placed in the field of view of the camera emit an expected yet continually varying pattern of pulses detectable through the camera, and an alarm is sounded if the expected pattern is not detected. One can then secure the visual field of the camera by raising an alarm if the camera sees any unauthorized activity occur in it. Current solutions for securing the visual field of a camera: the best known means to securing the visual field of a camera is to have a security guard (or image processing machine) watch the video signal from the camera and raise an alarm if this reveals any unauthorized activity. One might similarly watch the video signal after the fact to determine what happened in the area; this secures the area by threat of retribution. Both methods are vulnerable, however, to an attack in which the attacker inserts a false image or signal between the area to be monitored and the viewing device or image processing machine. The current invention closes the security loop by putting the authentication mechanism in the visual field itself.

Much like the familiar video security system, the current invention involves a camera sending a signal to a viewing device or image processing machine. It additionally involves a number of beacons scattered through the far end of the view area (or randomly through the view area if, like outerspace, it has no far end). Each beacon contains a clock and its own secret key for encryption. Each beacon encrypts the current time and emits the result on the encryption as a pattern of pulses visible to the camera. When the viewing device or image processing machine processes (e.g. displays) the video signal from the camera, it decrypts the patterns emitted by the beacons and raises an alarm if the result of the decryption does not match the time at which the video was supposed to be captured or if the beacon patterns are not present.

An extension of the beacon aspect of the present invention addresses the problem that occurs when using this invention on playback, at which time it is vulnerable to an attack that goes like this: an attacker does something they want to cover up in the view area at time, t. They note the patterns emitted by the beacons at t (either by detecting them at time t or by looking at the security tapes), then they construct a false image and superimpose the noted beacon patterns on it. The true image is replaced with the modified false image.

The solution to this problem is simply to have the camera digitally sign its output with public-private key encryption. Since this would involve a hash of everything the camera sees, the patterns emitted by the beacons would also get signed and it would become impractical to construct the forgery. Hash can be stored in the blanking space of the video frame, for example in the blanking space of every fourth frame.

Another extension of the beacon aspect of the present invention involves the situation where the view area is the surface of a scanner, the beacons may be replaced by the light source of the scanner which may emit the pattern that beacons would by modulating its intensity.

Various changes may be made in the above illustrative embodiments without departing from the scope of the invention, as will be understood by those skilled in the art. It is intended that all matter contained in the above description or shown in the accompanying drawings shall be interpreted as illustrative and not in a limiting sense. The invention disclosed herein can be implemented by a variety of combinations of hardware and software, and those skilled in the art will understand that those implementations are derivable from the invention as disclosed herein.

What is claimed is:

1. A handling system for handling items in a handling area, without breaching confidentiality of the items, comprising:

a view port device, for providing filtered visual access to at least a portion of the handling area wherein the view port device comprises:

an imaging device for viewing at least part of the handling area and for providing an unprocessed video signal;

an image processing unit, responsive to the unprocessed video signal, for providing a processed video signal; and a display screen, responsive to the processed video signal, wherein at least some information, contained in the at least one of items within the handling area, is filtered out of the processed video signal by the image processing unit; and a manual access area, for allowing manual access to the handling area while unfiltered visual access to the handling area is obstructed.

2. The system of claim 1, further comprising:

a video image recorder, for recording an image delivered by the processed video signal; and at least one authenticating beacon within view of the imaging device, for indicating chronologically when the at least one beacon is observed by the imaging device, wherein the chronological indication from the at least one authenticating beacon is encrypted, and wherein the imaging device is a video camera.

3. The system of claim 1, wherein the imaging device comprises a scanning device.

4. The system of claim 3, further comprising a security camera, and a video recorder for recording video information from the security camera.

5. The system of claim 4, further comprising at least one encrypted authenticating beacon within view of the security camera, for indicating chronologically when the at least one beacon is observed by the security camera.

6. The system of claim 1, wherein the image processing unit excludes the at least some information by omitting at least one inked area of the at least one item.

7. The system of claim 1, wherein the manual access area comprises at least two hand insertion portals.

8. The system of claim 7, wherein each of the at least two hand insertion portals is equipped with a glove for handling the items.

9. The system of claim 1, further comprising an airtight seal that offers protection against chemical or biological hazards, for sealing the handling area while opening the items.

10. The system of claim 1, wherein the view port device comprises a window having an optical property for filtering out the at least some information contained in the at least one of the items.

11. The system of claim 10, wherein the optical property is translucence.

12. The system of claim 1, wherein the manual access area allows free manual movement in any direction, wherein the system further comprises a security camera located outside the handling area for detecting whether at least one handling protocol has been followed, and wherein the at least one of the handling protocols includes a condition that no unauthorized viewing device, including an eye, is located at a position where unfiltered visual access to the handling area is possible.

13. The system of claim 12, further comprising at least one encrypted authenticating beacon within view of the security camera, for indicating chronologically when the at least one beacon is observed by the video camera.

14. A system for authenticating a video image of at least a portion of a secure area, comprising:

a video camera, for viewing at least the portion of the secure area;

a video image recorder, for recording an image produced by the video camera;

at least one authenticating beacon within view of the video camera, for indicating chronologically when the at least one beacon is observed by the video camera, wherein the chronological indication from the at least one authenticating beacon is encrypted; and an image processing unit, responsive to the video camera, for providing a processed video signal to the video image recorder; and wherein the image processing unit is for excluding at least some information, concerning confidential written material in an item viewed by the video camera, from the processed video signal.

15. The system of claim 14, wherein the video image recorder is also for recording a digital signature of the video camera, and wherein the digital signature is encrypted.

16. The system of claim 15, wherein the digital signature of the video camera includes hash stored in a blanking interval of a plurality of video frames.

17. The system of claim 16, wherein any two of the plurality of video frames are separated by at least one other video frame.

* * * * *